United States Patent
Wilding et al.

(10) Patent No.: US 7,447,829 B2
(45) Date of Patent: Nov. 4, 2008

(54) HEAP AND STACK LAYOUT FOR MULTITHREADED PROCESSES IN A PROCESSING SYSTEM

(75) Inventors: Mark Francis Wilding, Barrie (CA); Daniel Alan Wood, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 1067 days.

(21) Appl. No.: 10/687,221

(22) Filed: Oct. 15, 2003

(65) Prior Publication Data

US 2005/0086658 A1    Apr. 21, 2005

(51) Int. Cl.
*G06F 9/46* (2006.01)
*G06F 12/00* (2006.01)

(52) U.S. Cl. .............................. 711/1; 718/100; 718/104
(58) Field of Classification Search ................. 718/100, 718/104, 107; 711/1, 153; 707/100
See application file for complete search history.

(56) References Cited

U.S. PATENT DOCUMENTS

| | | | |
|---|---|---|---|
| 5,566,321 A * | 10/1996 | Pase et al. ..................... | 711/153 |
| 6,412,053 B2 | 6/2002 | Bonola ......................... | 711/170 |
| 6,427,195 B1 | 7/2002 | McGowen et al. ........... | 711/153 |
| 6,433,586 B2 | 8/2002 | Ooishi .......................... | 326/93 |
| 6,499,094 B1 | 12/2002 | Fraser et al. ................. | 711/171 |
| 6,505,275 B1 | 1/2003 | Weissman et al. ........... | 711/154 |
| 6,507,903 B1 | 1/2003 | Beatty, III et al. .......... | 711/173 |
| 2001/0000821 A1 | 5/2001 | Kolodner et al. ............ | 711/170 |
| 2001/0025295 A1 | 9/2001 | Kawachiya et al. ........ | 709/106 |
| 2002/0095453 A1 * | 7/2002 | Steensgaard ............... | 709/107 |
| 2002/0104077 A1 | 8/2002 | Charnell et al. ............. | 717/162 |
| 2002/0129306 A1 | 9/2002 | Flanagan et al. ........... | 714/100 |
| 2002/0199069 A1 | 12/2002 | Joseph ........................ | 711/147 |
| 2003/0018826 A1 | 1/2003 | Chaudhry et al. ........... | 709/310 |
| 2003/0221067 A1 | 11/2003 | Jacobs et al. | |

OTHER PUBLICATIONS

Hammersley, S.D. et al., "Sharing a Single Stack Among Multiple Concurrent Threads," IBM Technical Disclosure Bulletin, vol. 36, No. 10, Oct. 1993, pp. 235-237.

Carlson, W.C. et al., "Thread Stack Monitor for Multithreaded Applications," IBM Technical Disclosure Bulletin, vol. 39, No. 3, Mar. 1996, pp. 283-284.

(Continued)

*Primary Examiner*—Meng-Ai An
*Assistant Examiner*—Kenneth Tang
(74) *Attorney, Agent, or Firm*—Patterson & Sheridan, LLP

(57) ABSTRACT

A method and system in accordance with the present invention comprises a thread stack/thread heap combination, wherein the thread heap is for thread local memory usage and wherein the thread stack and thread heap grow in opposite directions. In the present invention the thread specific heap is allocated next to the thread's stack and grows in the opposite direction from that of the stack. This improvement allows the current space management of thread stacks, which spread out the memory placement of multiple stacks to avoid collision, to also be used for the heaps without additional overhead or complexity. It also allows the existing growth scheme of adding memory pages to the process for the stack to be used again because the growth is simply in the opposite direction. Thread specific heaps eliminate the need for expensive synchronization when allocating from a shared heap in a multiprocessor environment.

9 Claims, 5 Drawing Sheets

OTHER PUBLICATIONS

Henderson, Fergus, "Accurate Garbage Collection in an Uncooperative Environment," Dept. of Computer Science & Software Engineering, The University of Melbourne, Victoria, Australia, 7 pages.

Kuechlin, Wolfgang W. et al., "On Multi-Threaded List-Processing and Garbage Collection," IEEE, 1991, pp. 894-897.

"Staggering Call Stack Offsets for Multiple Duplicate Control Threads," IBM Docket ROC920020014US1, 9 pages.

Conference on Programming Language Design and Implementation Proceedings of the 1997 ACM SIGPLAN Conference on Programming Language Design and Implementation, 1997, Las Vegas, Nevada, 5 pages.

Fine-grain multithreading with minimal compiler support-a cost effective approach to implementing efficient multithreading languages; Tarua K; Yonezawa A; SIGPLAN Notices, vol. 32, No. 5, pp. 320-333, May 1997.

"Staggering Call Stack Offsets for Multiple Duplicate Control Threads," IBM Docket ROC920020014US1, 9 pages, date unknown.

* cited by examiner

HEAP AND STACK LAYOUT FOR MULTITHREADED PROCESSES IN A PROCESSING SYSTEM

FIELD OF THE INVENTION

The present invention relates generally to processing systems and more particularly to multithreaded processing systems.

BACKGROUND OF THE INVENTION

Many data processing systems utilize multithreaded processes for processing data. The allocation of private memory in a multithreaded process can cause unwanted contention on the process heap. FIG. 1 is a diagram that illustrates the address space 10 for a multithreaded process. As is seen, there are a plurality of threads with their associated stacks 12a-12n, each of which can access the shared heap 14. Included within the address space 10 is data 16 and code 18. A function such as malloc is typically used to allocate memory for all threads in a process. Dynamically allocated data in a multithreaded process comes in two main forms: (1) thread shared (shared between one or more threads) and (2) thread local (used by only one thread).

Using functions like malloc( ) and free( ) to allocate memory which is shared between threads makes sense since malloc and free are for process wide memory. Using malloc and free for thread local memory is not a good choice since only one thread will make use of the memory and yet all threads must coordinate there access to the shared heap. Since malloc and free do not support pools, the contention on an underlying memory management facility can become unacceptably high. It is possible to assign pools within the heap for a thread or group of threads. In so doing the contention between threads can be reduced. Pools reduce the contention by spreading out the allocations and frees over the number of pools. While pools are useful, they have their own set of problems.

If pools are created on top of the standard malloc and free interface, large blocks of memory of the heap will likely need to be allocated. Allocating smaller amounts and assigning them to a pool can increase the contention on the underlying memory management facility and potentially negate any benefit from having separate pools.

Allocating large blocks of memory from the process heap will likely lead to wasted space in one or more forms. There is also a balance that needs to be met between the number of threads per pool and the contention on the pool. Having too many threads in a pool means higher contention and having too few threads in a pool will likely lead to wasted space. Also, when more than one thread uses the same pool then the chances of inter-thread memory corruptions increases. Therefore, it would be advantageous for reliability and problem determination efforts to ensure that each thread used a separate pool.

Another option is to create an anonymous memory region (e.g., by mapping in /dev/zero, etc.) for each pool. Such memory regions could in theory grow in the same way as the process heap grows which would reduce the need to allocate large blocks of memory for a pool. Having a separate memory region for each pool means that the address space for a pool will be contiguous and thus the large blocks of memory required when using the same memory region (i.e., the process heap) is not necessary. The problem with having a separate memory region for each pool is that the number of memory regions can easily get out of hand. In a process that has 1000 threads, and where there is one memory pool per thread we could end up with 1000 regions of memory for thread local memory and 1000 regions of memory for the corresponding thread stacks (thread stacks use one region of memory).

Having a large number of memory regions can lead to unwanted overhead in the kernel to manage this many memory regions. Also, the more memory regions in use, the worse the address space fragmentation is.

Accordingly, what is desired is a method and system of reducing contention for thread stack that does not increase the number of memory regions needed for a processor. The method and system should be easily implemented, cost effective and adaptable to existing system. The present invention addresses such a need.

SUMMARY OF THE INVENTION

A method and system in accordance with the present invention comprises a thread stack/thread heap combination, wherein the thread heap is for thread local memory usage and wherein the thread stack and thread heap grow in opposite directions.

In the present invention, the thread specific heap is allocated next to the thread's stack and grows in the opposite direction from that of the stack. This improvement allows the current space management of thread stacks, which spread out the memory placement of multiple stacks to avoid collision, to also be used for the heaps without additional overhead or complexity. It also allows the existing growth scheme of adding memory pages to the process for the stack to be used again because the growth is simply in the opposite direction. Thread specific heaps eliminate the need for expensive synchronization when allocating from a shared heap in a multi-processor environment.

In the present invention, a method and system is provided that reduces contention for thread-local private memory and does not increase the number of memory regions needed for a process. The thread stack and a thread heap are combined into the same memory region, grow in opposite directions, and separated with a dead zone between adjacent thread stack/heap regions.

DETAILED DESCRIPTION

The present invention relates generally to processing systems and more particularly to multithreaded processing systems. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A system and method in accordance with the present invention reduces contention for thread-local private memory but does not increase the number of memory regions needed for a process. In a system and method in accordance with the present invention the thread stack and a thread heap for memory allocation are combined into the same memory region.

Figure 1:
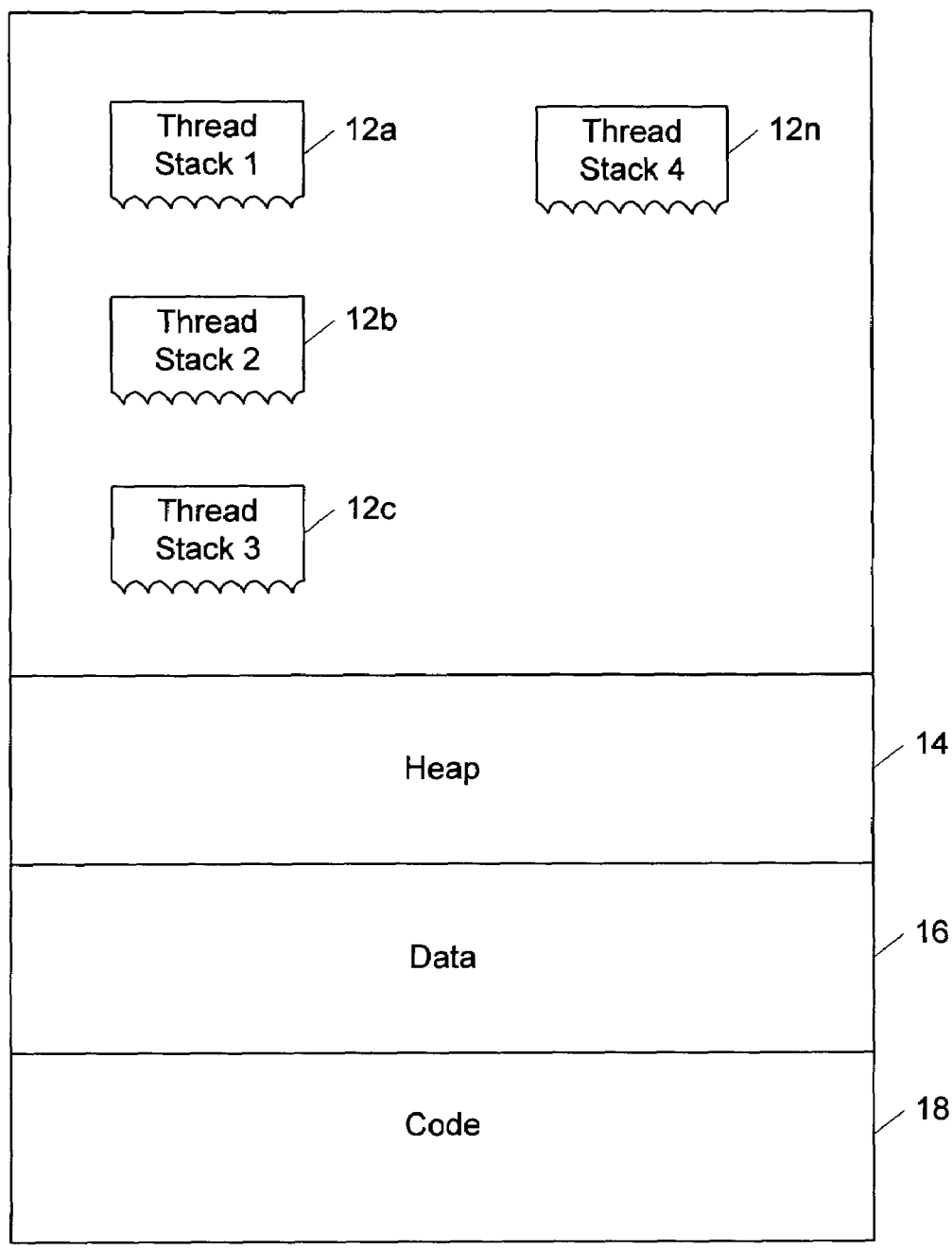
FIG. 1 is a diagram that illustrates the existing memory layout for a multithreaded process.
Figure 2:
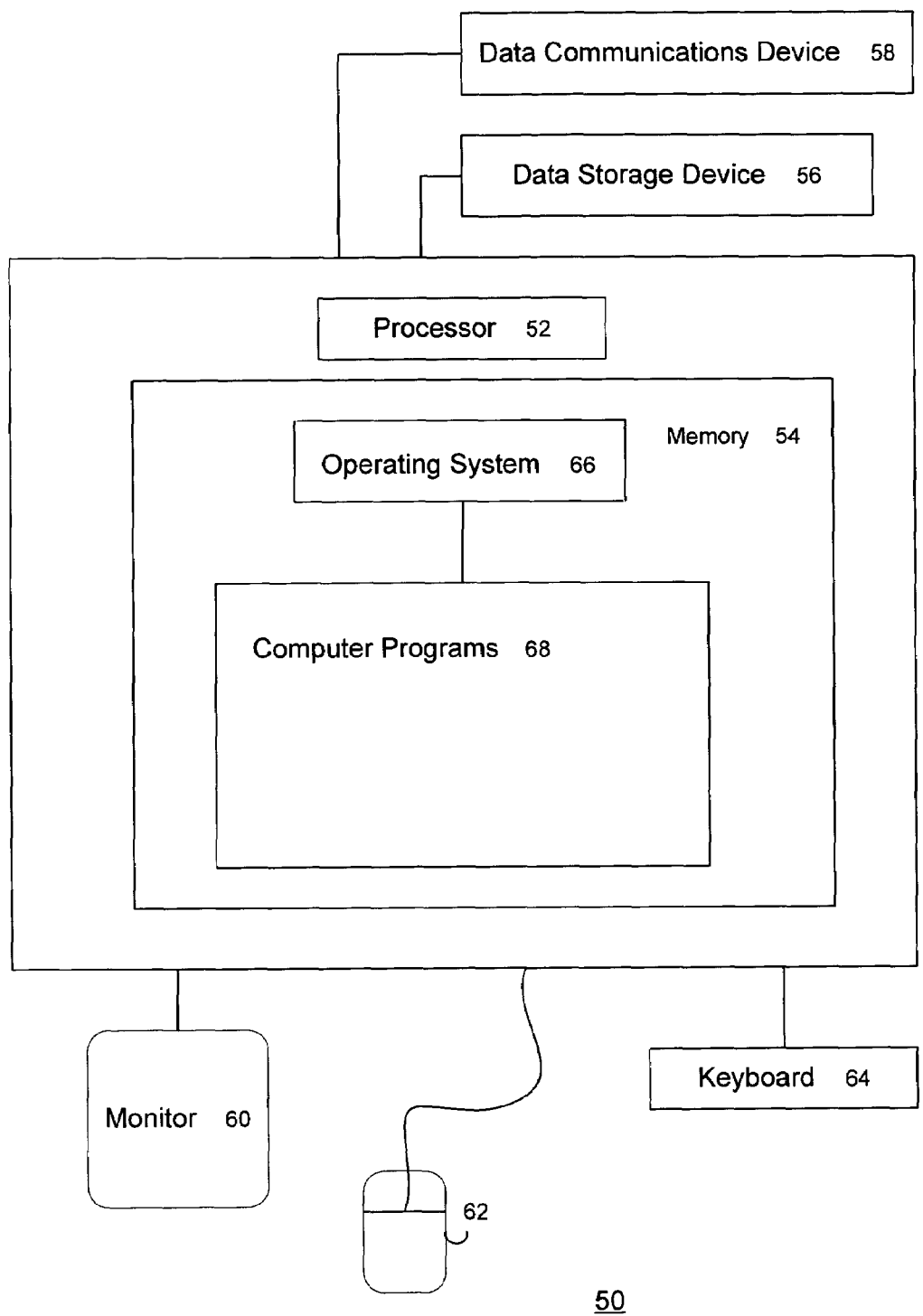
FIG. 2 illustrates a hardware environment used to implement a preferred embodiment of the present invention.

FIG. 2 illustrates a hardware environment used to implement a preferred embodiment of the present invention. As illustrated in FIG. 2, the preferred embodiment of the present invention is implemented in a computer 50. The computer 50 generally includes a processor 52, a memory 54 such as a random access memory (RAM), a data storage device 56 (e.g., hard drive, floppy disk drive, CD-ROM disk drive, etc.), a data communication device 58 (e.g., a modem, network interface device, etc.), a monitor 60 (e.g., CRT, LCD display, etc.), a pointing device 62 (e.g., a mouse, a track ball, a pad or any other device responsive to touch, etc.) and a keyboard 64. It is envisioned that attached to the computer 50 may be other devices such as read only memory (ROM), a video card drive, printers, peripheral devices including local and wide area network interface devices, etc. One of ordinary skill in the art will recognize that any combination of the above components may be used to configure the computer 50.

The computer 50 operates under the control of an operating system ("OS") 66, such as MVS™, AIX®, UNIX®, OS/2®, WINDOWS™, WINDOWS NT™, etc., which typically is loaded into the memory 104 during the computer 50 start up (boot-up) sequence after power-on or reset. (AIX and OS/2 are registered trademarks and MVS is a trademark of International Business Machines Corporation in the United States, other countries, or both. Windows and Windows NT are trademarks of Microsoft Corporation. UNIX is a registered trademark in the United States and/or other countries licensed exclusively through X/Open Company Limited.) In operation, the OS 66 controls the execution by the computer 50 of computer programs 68, including computer programs. Alternatively, a method, system and article of manufacture in accordance with the present invention may be implemented with any one or all of the computer programs 68 embedded in the OS 66 itself without departing from the scope of the invention. Preferably, however, the client programs are separate from the computer programs.

The OS 66 and the computer programs 68 each comprise computer readable instructions that, in general, are tangibly embodied in or are readable from a media such as the memory 54, the data storage device 56 and/or the data communications device 58. When executed by the computer 50, the instructions cause the computer 50 to perform the steps necessary to implement the present invention. Thus, the present invention may be implemented as a method, apparatus, or an article of manufacture (a computer-readable media or device) using programming and/or engineering techniques to produce software, hardware, firmware, or any combination thereof.

Figure 3:
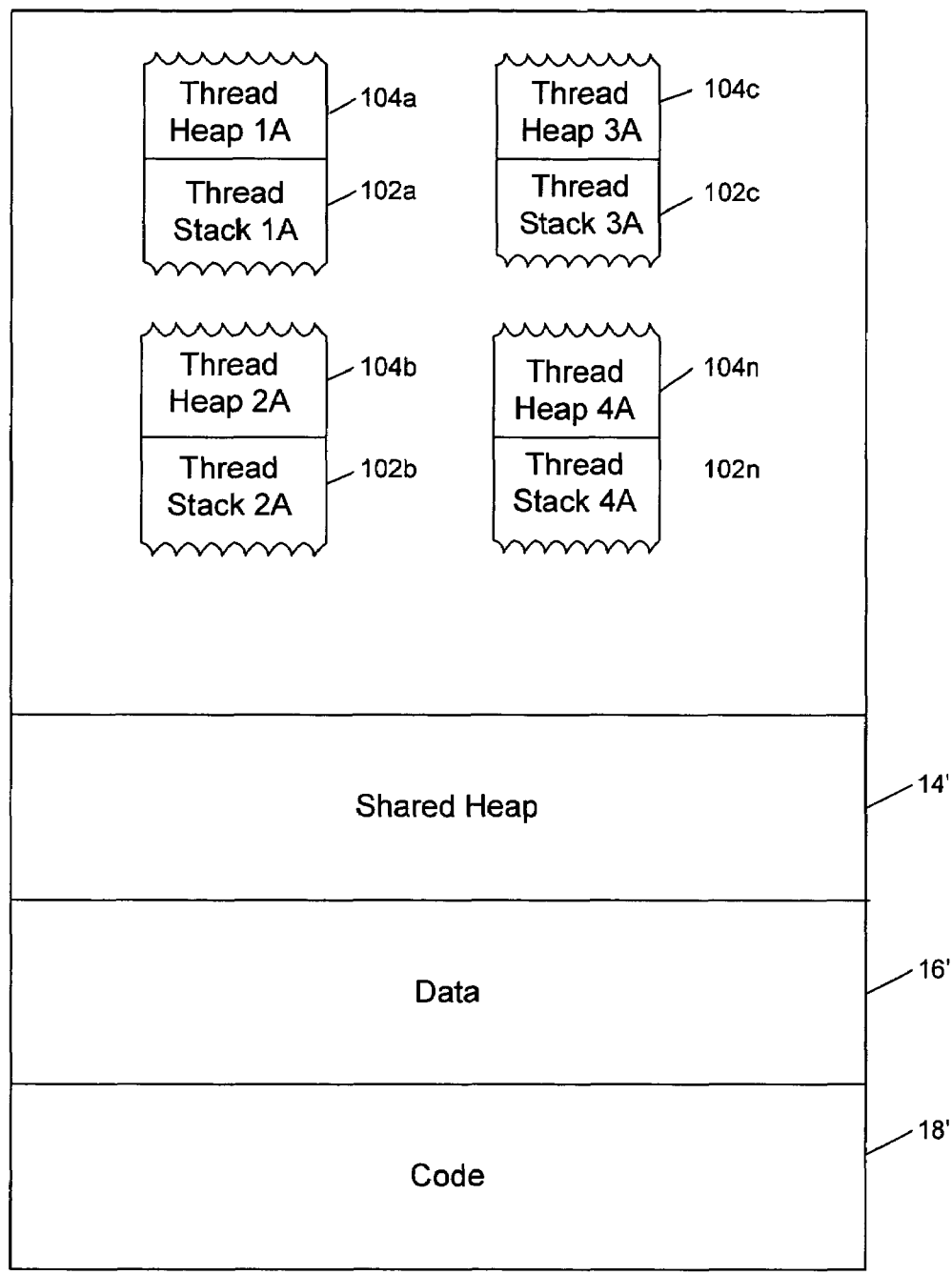
FIG. 3 illustrates an address space in accordance with the present invention.

The system and method in accordance with the present invention provides for adjoining thread heap-thread stack pairs in which the thread heap and thread stack grow in directions that are opposite from each other. FIG. 3 illustrates an address space 100 in accordance with the present invention. As is seen, each of the thread stacks 102a-102n now has their own private thread heap 104a-104n respectively. In so doing, the contention between threads is never a problem. In a preferred embodiment, at the same time the thread stack is generated, the thread heap is also created.

Figure 4:
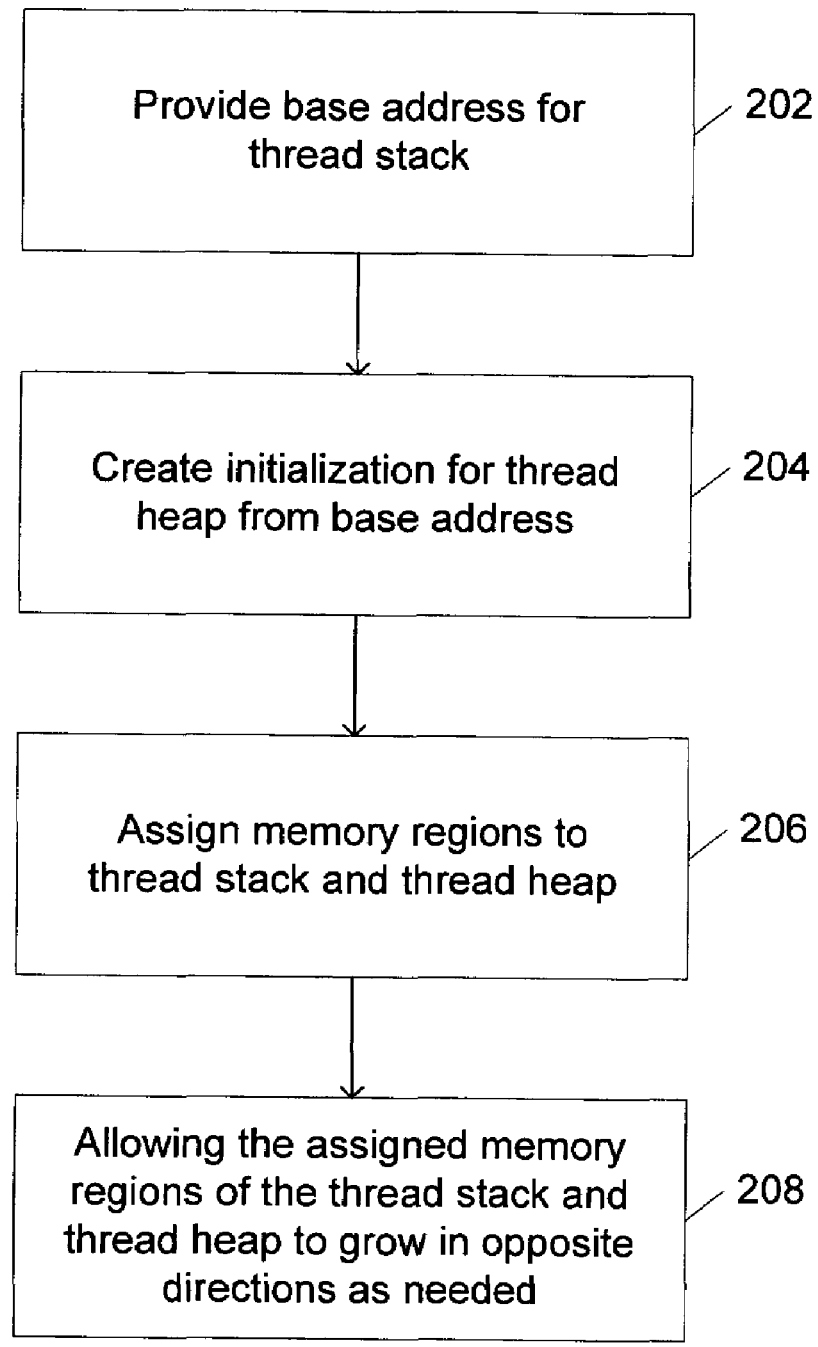
FIG. 4 is a flow chart that illustrates a method for providing the thread heap/thread stack combination.

FIG. 4 is a flow chart that illustrates a method for providing the thread heap/thread stack combination. First, as is seen, a base address for the thread stack is provided, via step 202. As is well known, the stack of the traditional UNIX process has "autogrow" support by the operating system. That is, if the stack grows beyond its initial size the operating system automatically increases its size as needed (or until it runs into some other defined segment).

Thereafter an initialization 204 for the private thread heap is generated from the same base address. Memory regions are assigned then for the thread stack and thread heap, via step 206. Finally, the assigned memory regions are allowed to grow in opposite directions as needed, via step 208.

Figure 5:
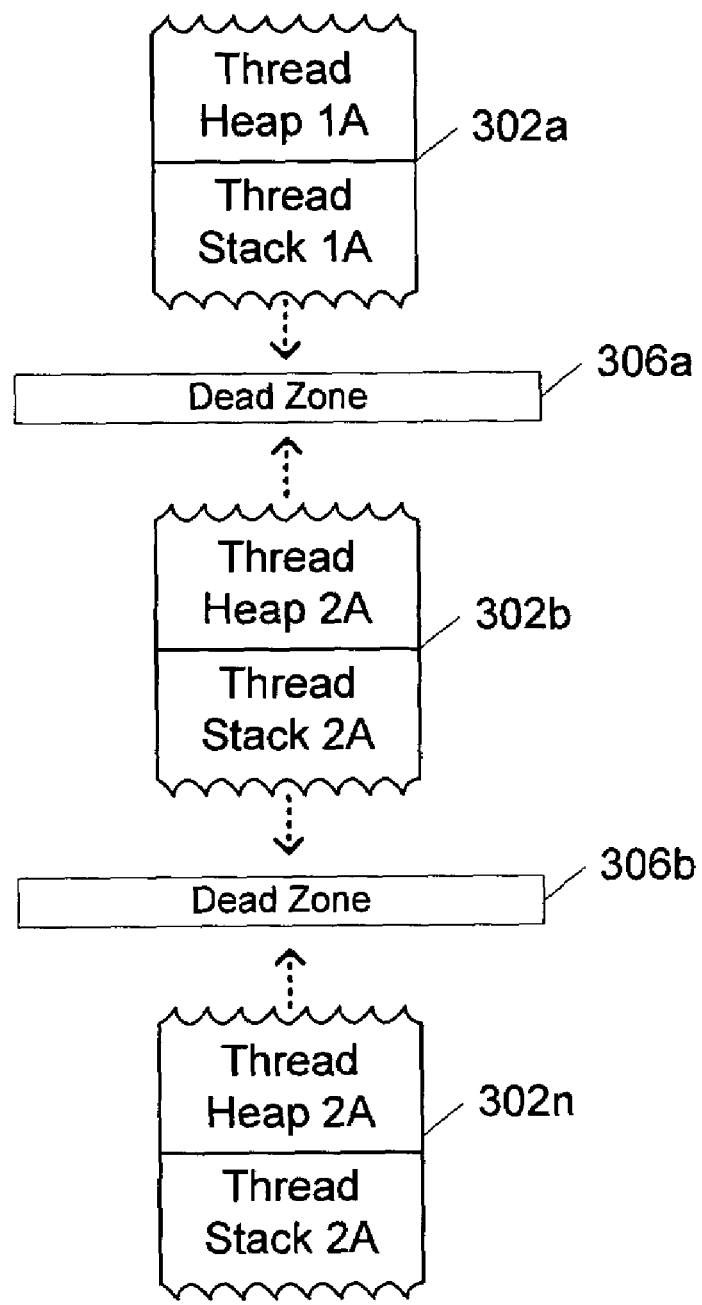
FIG. 5 is an illustration of a portion of the address space in which there is a plurality of thread heap/thread stack combinations.

In addition, to ensure that the thread stacks/thread heap combinations do not affect the memory and other thread stacks/thread heap combinations, a dead zone is placed there between. FIG. 5 illustrates this in more detail. FIG. 5 is an illustration of a portion of the address space in which there is a plurality of thread heap/thread stacks 302a-302c combinations. In a preferred embodiment, there are dead zones 306a and 306b in the spaces between the thread heap/thread stack combinations. It is impossible to read from or to write to any area within a dead zone. In so doing, there is no chance of memory corruption between any of these thread heap/thread stack combinations.

By combining both required types of memory for a thread into a single memory region, the system and method in accordance with the present invention:

1. Does not increase the required number of memory regions compared to previous memory layouts. This ensures that the invention does not require any significant resources (memory or CPU) in the kernel to manage extra memory regions.

2. Allows each thread to have a separate "thread heap" for thread-local memory allocations. This can greatly reduce the contention on the process wide memory management facility.

3. Helps to protect each thread from inter-thread memory corruptions caused by memory overruns.

Accordingly, a system and method in accordance with the present invention is provided which minimizes contention between threads when executing a process. Therefore the performance and efficiency of the system is greatly enhanced.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for reducing contention in a multithreaded processor; the method comprising the steps of
    (a) providing at least two thread stack/thread heap combinations in an address space on the processor, wherein each thread heap is for thread local memory usage and wherein each thread stack and thread heap combination grows in opposite directions; and
    (b) providing a dead zone between the at least two thread stack/thread heap combinations, wherein data can not be written to, read from and executed from the dead zone.

2. The method of claim 1 wherein the providing step (a) further comprises the steps of:
    (a1) providing a base address for each thread stack;

(a2) creating an initialization for each thread heap from the base address; and (a3) assigning memory regions in the address space to each thread stack and thread heap combination.

3. The method of claim 2, further comprising the step of (a4) allowing the assigned memory regions of each thread stack and thread heap combination to grow in opposite directions as needed.

4. A computer readable medium containing program instructions for reducing contention in a multithreaded processor; the program including instructions for:

(a) providing at least two thread stack/thread heap combinations in an address space on the processor, wherein each thread heap is for thread local memory usage and wherein each thread stack and thread heap combination grows in opposite directions; and (b) providing a dead zone between the at least two thread stack/thread heap combinations, wherein data can not be written to, read from and executed from the dead zone.

5. The computer readable medium of claim 4 wherein the program instructions (a); further comprise the steps of:

(a1) providing a base address for each thread stack;

(a2) creating an initialization for each thread heap from the base address; and (a3) assigning memory regions in the address space to each thread stack and thread heap combination.

6. The computer readable medium of claim 5, wherein the instructions further comprise, instructions for (a4) allowing the assigned memory regions of each thread stack and thread heap combination to grow in opposite directions as needed.

7. A system for reducing contention in a multithreaded processor; the system comprising:

means for providing at least two thread stack/thread heap combinations in an address space on the processor, wherein each thread heap is for thread local memory usage and wherein each thread stack and thread heap combination grows in opposite directions, means for providing a dead zone between the two thread stack/thread heap combinations, wherein data can not be written to, read from and executed from the dead zone.

8. The system of claim 7 wherein the means for providing at least two thread stack/thread heap combinations further comprises:

means for providing a base address for each thread stack;

means for creating an initialization for each thread heap from the base address; and means for assigning memory regions in the address space to each thread stack and thread heap combination.

9. The system of claim 8 which includes means for allowing the assigned memory regions of each thread stack and thread heap combination to grow in opposite directions as needed.

* * * * *